United States Patent
Wilhelm et al.

(10) Patent No.: US 6,532,638 B2
(45) Date of Patent: Mar. 18, 2003

(54) METHOD OF MAKING FLAT BLADE WINDSHIELD WIPERS FOR A MOTOR VEHICLE WITH CURVED FLAT BLADE

(75) Inventors: Manfred Wilhelm, Eberdingen (DE); Julius Mazurkiewicz, Diest (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/942,327

(22) Filed: Aug. 29, 2001

(65) Prior Publication Data

US 2002/0046454 A1 Apr. 25, 2002

Related U.S. Application Data

(63) Continuation-in-part of application No. 09/445,880, filed on Feb. 22, 2000, now abandoned.

(30) Foreign Application Priority Data

Apr. 15, 1998 (DE) .......................................... 198 16 609

(51) Int. Cl.[7] .......................... B23Q 17/00; B23P 11/00
(52) U.S. Cl. ...................... 29/407.04; 29/33 S; 29/428; 29/417
(58) Field of Search ..................... 29/417, 412, 407.04, 29/407.09, 407.1, 428, 446, 449, 448, 33 S; 72/240, 30.2, 168, 167

(56) References Cited

U.S. PATENT DOCUMENTS

| 1,489,894 | A | | 4/1924 | Monteith et al. | |
|---|---|---|---|---|---|
| 3,820,373 | A | * | 6/1974 | Shiguma et al. | ............... 72/240 |
| 5,875,672 | A | * | 3/1999 | Fourie et al. | .................. 72/240 |

FOREIGN PATENT DOCUMENTS

NL 7807-040 6/1978

* cited by examiner

Primary Examiner—S. Thomas Hughes
Assistant Examiner—Marc Jimenez
(74) Attorney, Agent, or Firm—Michael J. Striker

(57) ABSTRACT

In a method for producing flat-blade windshield wipers with curved flat blades in particular, and for obtaining dimensionally stable bending radii with exact tolerances, a spring band formed by flat blades individually arranged one next to the other, is bent between three support sites spaced from each other in the longitudinal direction of the spring band and resting successively in an alternating manner on one of the two sides of the spring band, and the spring band is thereafter re-bent on a subsequent support site in the opposite direction by a re-bending degree lower than the bending degree. The flat blade so treated is subsequently separated from the spring band, combined with a rubber-elastic wiping strip, and provided with a connecting device for a wiper arm.

11 Claims, 2 Drawing Sheets

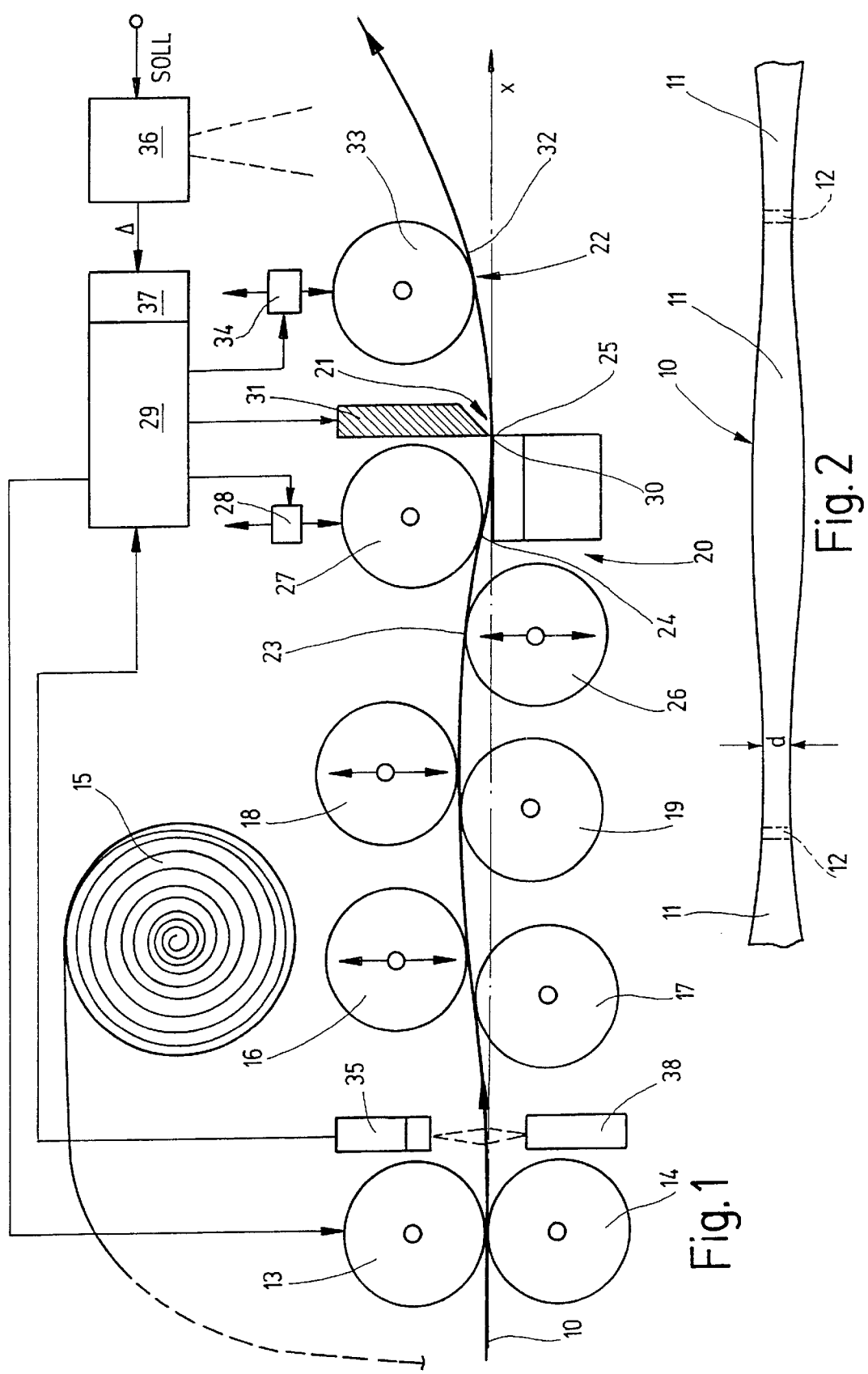

METHOD OF MAKING FLAT BLADE WINDSHIELD WIPERS FOR A MOTOR VEHICLE WITH CURVED FLAT BLADE

CROSS-REFERENCE TO A RELATED APPLICATION

This application is a continuation-in-part of application Ser. No. 09/445,880 filed Feb. 22, 2000 now abandoned.

BACKGROUND OF THE INVENTION

The invention relates to a method of producing flat-blade windshield wipers for motor vehicles with curved flat blades.

Such flat-blade windshield wipers are known from U.S. Pat. No. 3,192,551, wherein one single back of the spring band, being engaged by the wiper arm of the windshield wiper in the center, produces a nearly uniform contact pressure of the rubber wiping strip, secured on its back, on the surface of the windshield over the entire wiping range, such windshield being curved, as a rule. For this purpose, the curved back of the spring band has a material thickness changing over its length, such thickness being the greatest in the center of the back and decreasing toward the two ends of the back, and, furthermore, has a changing back width, which decreases from the center of the back toward the ends thereof.

A method and a device for producing metal strips with varying material thickness are known from WO 94/17932. Such metal strips are used as compoents of windshield wipers. In this process, a strip material having a constant thickness and width is drawn through a pair of counteropposed rolls, whereby the spacing of the rolls is varied in order to shape in this way the strip material with a thickness varying by sections over the length of said material. The material is then finally subjected to a heat treatment.

SUMMARY OF THE INVENTION

The method as defined by the invention for producing flat-blade windshield wipers with curved flat blades offers the advantage that flat blades required directly as components of flat-blade windshield wipers, are produced in one single step from a heat-treated spring band blank with varying material thickness.

Flexing and re-flexing takes place in this process as the spring band is continuously advanced, such feed being interrupted briefly periodically for separating the flat blades. The method as defined by the invention supplies final flat-blade products with preset bending radii and largely within exact tolerances, which are absolutely stable dimensionally, and will no longer deform even as they are separated from the band material. Owing to the fact that the center one of the three support sites for the bending of the spring band, and the fourth support site for the re-bending of the spring band each are transversely displaceable relative to the spring band in the direction of the thickness of the band, and that their transverse displacements relative to the spring band are controlled according to preset programs, taking into account the changing material thickness within the flat blades, the spring band undergoes uniform plastic deformation in all regions. It is possible at the same time to realize different bending radii within one flat blade. In the programs for controlling the displacement motion of the two support sites, other parameters influencing the manufacturing result are taken into account as well, in addition to the variable material thickness and, if need be, different bending radii of the flat blades based on zones, such other parameters being, for example the band hardness, the band width, prior alignment of the spring band, sense of winding of the spring band on a supply coil, etc.

For maintaining most exacting manufacturing tolerances, provision is made according to an advantageous further development of the method as defined by the invention that at least some of the separated flat blades are optically measured and compared with nominal value specifications. The mean deviations from the nominal values are used for correcting the bending and re-bending programs.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The invention is explained in greater detail in the following description with the help of the exemplified embodiment of a device shown in the drawing, where the figures show the following schematic representations:

FIG. 1 is a side view of a device for producing curved flat blades for flat-blade windshield wipers.

FIG. 2 shows by a cutout an enlarged side view of a spring band with varying material thickness used for producing the curved flat blades.

DESCRIPTION OF THE PREFERRED EMBODIMENTS

Figure 3:
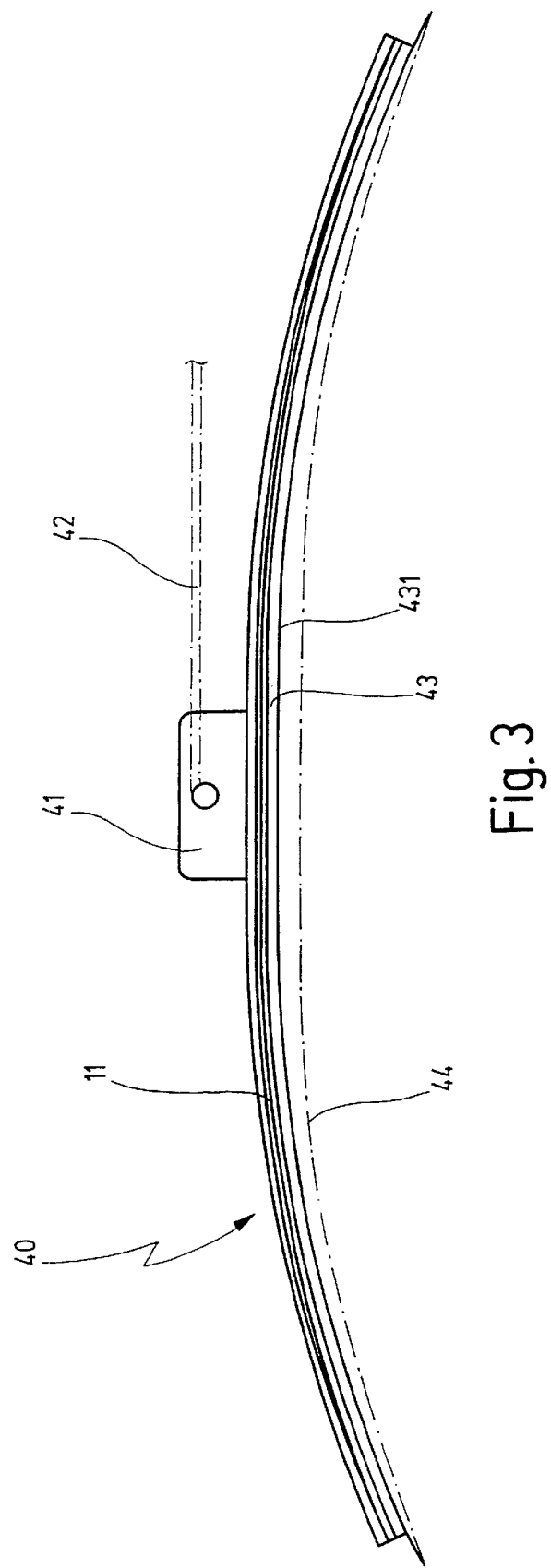
FIG. 3 is a side view of a flat-blade windshield wiper.

The device schematically shown in FIG. 1 in side view, for producing curved flat blades for flat-blade windshield wipers, is supplied with a spring band 10, the latter being shown schematically and enlarged by the cutout in FIG. 2. Individual flat blades 11 of the same type are consecutively fixed one after the other in spring band 10, with their heads and ends being marked in spring band 10 by so-called trigger holes 12. The material thickness or band thickness "d" of the spring band 10 varies within each flat blade 11, as clearly shown in FIG. 2. In a realistic exemplified embodiment, the band thickness "d" varies between a maximum value of 1.2 mm and a minimum value of 0.4 mm, whereby the band thickness "d" decreases from the center of each flat blade 11 toward the two ends. The material thickness or the band thickness "d" of the spring band 10 can be also constant from one end to the other end, as not shown in the drawing.

Viewed in the direction in which the spring band travels through or is advanced through the device, the latter has two feed rolls 13, 14 engaging the two opposite sides of the spring band 10. Said feed rolls are motor-driven and numerically controlled (NR), and pull the spring band 10 from a supply coil 15. Furthermore, the device has a plurality of guide rollers, in the present case four guide rollers 16 to 19 (or also six guide rolls, if need be), which engage in pairs the opposite sides of spring band 10, and which are not driven. Furthermore, the device has a bending unit 20, a separation unit 21, and a re-bending unit 22. The two guide rollers 16, 18 engaging the spring band 10 on the top side of the latter are displaceable in the vertical direction, i.e. at right angles relative to spring band 10, and can be adjusted manually in order to assure tight guidance of spring band 10 without permitting the latter to "buckle out".

The bending unit 20 comprises three support sides 23 to 25, which are spaced from each other and successively rest alternatingly against the one and the other side of the band, viewed in the direction in which the latter travels through the device. Viewed in the direction of feed of the spring band 10, the first and second support sites 23, 24 each are formed by the circumference of a roll or roller 26 and 27, respectively, the axles thereof being transversely displaceable relative to spring band 10 in the direction of band thickness "d". The first roller 26 is adjustable manually, whereas the roller 27, which is hereinafter referred to as the bending roller 27, is adjusted by a servo-motor 28, which is controlled by an NC control unit 29. The third support site 25 of the bending unit 20 is formed by a cutting edge 30, which is greater than the width of the spring band 10, and which, for separating a flat blade 11, cooperates with a cutter 31, which is moved vertically, i.e. transversely relative to the spring band 10, and guided past the cutting edge 30. The cutting edge 30 and the cutter 31 jointly form the separation unit 21, which thus is arranged at the end of the bending unit 20 and integrated in the bending unit 20 due to the design of the fourth support side 25 in the form of cutting edge 30.

The re-bending unit 22, which is located downstream of the separation unit 21, consists of a fourth support site 32 engaging the same band side of the spring band 10 as the center support site 24 of the bending unit 20, thus as the bending roller 27. Here, too, said fourth support site 32 is formed by the circumference of a roll or roller, the so-called re-bending roller 33. The axle of said re-bending roller 33 is also displaceable transversely to the spring band 10 in the direction of the band thickness "d". The displacement of the re-bending roller 33, i.e. the motion setting it in its acting position, is again effected by means of a servo-motor 34, which is controlled by the NC control unit 29.

With the device described above, the curved flat blades are produced as follows:

The spring band 10 continuously taken off from the supply coil 15 is bent by sections between the three support sites 23 to 25 of the bending unit 20, whereby the bending radius is determined by adjusting the center support site 24 in its operating positions as required. Subsequently, the flat blade 11 so bent is bent back on the following fourth support site 32 in the opposite direction, whereby the degree of re-bending is substantially smaller than the bending degree. The degree of re-bending required in order to assure the dimensional stability of the bent flat blade 11 is determined empirically. A degree of re-bending amounting to about 10 to 20% of the bend previously produced was found to be the mean value depending on the quality of the spring band 10. Since the bending radius of the finished flat blade 11 is predetermined, bending of the spring band 10 between the three support sites 23 to 25 is carried out with a bending degree increased by the degree of re-bending on the fourth support site 32.

The feeding motion for the center support site 24 for bending the band, and for the fourth support site 32 for re-bending the spring band is controlled according to preset programs, which take into account especially the changing material thickness of the flat blade. In addition, it is possible to take into account in said programs also different bending radii desired within the flat blade in certain zones. Furthermore, other parameters influencing the production result such as, for example the hardness and width of the band, prior alignment of the spring band, winding sense of the spring band on the supply coil 15, etc., are taken into account in the programs. The described control of the feeding movements of the support sites 24 and 32 is effected with the NC control unit 29, which controls the servo-motors 28 and 34 depending on the NC-axis (x-axis) of the feed rolls. The latter, in turn, effect a displacement of the axis of the bending roller 27 forming the center support site 24, or of the axis of the re-bending roller 33 forming the support site 32, by a corresponding amount toward the spring band 10 or away from the latter. The NC control unit 29 is triggered by the trigger holes 12 in the spring band 10. Said trigger holes 12 are detected by an optical sensor 35, which cooperates with a light source 38, and which is arranged upstream of the guide rollers 16 to 19. Upon detection of said trigger holes, said sensor 35 transmits s triggering signal to the control unit 29 and thereby calls up the execution of the program. The trigger holes 12 consequently determine the start and the end of the bending and re-bending programs to which the individual flat blades 11 are subjected, as well as the subsequent separation process in that the control unit 29 also triggers the cutting motion of the cutter 31 after the program has been completed, or executed. For separating the finished curved flat blades 11 from the spring band 10, the continuous feed of the spring band 10 is briefly interrupted for each cut.

For the purpose of obtaining tight manufacturing tolerances, at least some of the flat blades 11 are optically measured, which can be done prior to or after the separation step, and compared with preset nominal values. The mean deviations from the rated values are used for correcting the bending and re-bending programs. For this purpose, provision is made for a graphic acquisition system 36, with which the finished flat blades 11 are optically measured and the deviations from the specified nominal values are determined. The graphic acquisition system 36 is connected to a correction unit 37, which changes suitable parameters in the programs of the NC control unit 29 in accordance with the deviations from nominal values, so that a control circuit is formed for correcting the bending degree. The programs stored in the NC-unit are adapted to a defined shape of the finished flat blades 11 and have to be newly generated or modified for changed shapes of the flat blades 11.

For producing a flat-blade windshield wiper 40 as shown by a side view in FIG. 3, the flat blade 11 produced as described above is provided with a connecting device 41 for a wiper arm 42; its surface is hardened, and combined with a wiping strip 43 having the elasticity of rubber. The wiper arm 42 indicated in FIG. 3 by dash-dotted lines is put into an oscillating motion in the known manner by a wiper gearing, which drives the wiping edge 431 of the wiping strip 43 across the windshield indicated by the dash-dotted line and denoted by reference numeral 44. The wiping strip 43 can be mounted by pressing the flat blade 11 into a plane position and gluing or vulcanizing the wiping strip 43 to the concave side in the unstressed condition. However, it is possible also to clamp the wiping strip 43 between two flat blades produced in the same way, whereby the two flat blades are then kept together by the connecting device, which still needs to be mounted, as well as by additional clips, if need be. It is important in this connection that the two flat blades have exactly the same bending curvature so as to avoid stresses in the wiping blade.

The novel features of the present are set forth on the appended claims.

What is claimed is:

1. A method of producing flat-blade windshield wipers for motor vehicles with curved flat blades, the method comprising the steps of;

feeding a spring band formed of a plurality of flat blades arranged one next to another in a direction of elongation of said spring band through feed rolls and guide rolls;

bending said spring band in one transversal direction between three support sites spaced from each other in a direction of feeding of said spring band and resting successively in an alternating manner on one of two sides of said spring band;

re-bending said spring band in another transversal direction opposite to said one transversal direction in a fourth support site arranged subsequently to said three support sites by a degree of re-bending lower than a bending degree in said bending step;

adjusting a degree of bending during a bending process to realize different bending radii within one flat blade;

separating each individual flat blade of a re-bent spring band from a remaining spring band;

combining each individual flat blade with a rubber-elastic wiping bar;

and mounting to said re-bent flat blade combined with said wiping bar a connection device for a wiper arm.

2. The method according to claim 1, further comprising the step of adjusting the degree of bending of said spring band in said three support sites by the degree of re-bending greater in said fourth support site than a required final bending radius of the flat blade.

3. The method according to claim 1, comprising the step of determining the degree of re-bending empirically.

4. The method according to claim 1, comprising the step of selecting the degree of re-bending at 10 to 20% of the bending degree.

5. The method according to claim 1, wherein remaining support sites are formed by a circumference of one of a roll or a roller.

6. The method according to claim 1, comprising the step of marking of said flat blades successively arranged in said spring band by trigger holes used for controlling a start and an end of programs in said bending step and said re-bending step and for triggering said separating step.

7. The method according to claim 1, wherein said bending step and said re-bending step are carried out at the same time as said feeding step and said feeding step is briefly interrupted in said separating step.

8. The method according to claim 1, comprising the step of heat-treating a surface of said flat blades.

9. A method of producing flat-blade windshield wipers for motor vehicles with curved flat blades, the method comprising the steps of;

feeding a spring band formed of a plurality of flat blades arranged one next to another in a direction of elongation of said spring band through feed rolls and guide rolls;

bending said spring band in one transversal direction between three support sites spaced from each other in a direction of feeding of said spring band and resting successively in an alternating manner on one of two sides of said spring band;

re-bending said spring band in another transversal direction opposite to said one transversal direction in a fourth support site arranged subsequently to said three support sites by a degree of re-bending lower than a bending degree in said bending step;

separating each individual flat blade of a re-bent spring band from a remaining spring band:

combining each individual flat blade with a rubber-elastic wiping bar, mounting to said re-bent flat blade combined with said wiping bar a connection device for a wiper arm;

wherein in said bending step, a central support site of said three support sites and, in said re-bending step, said fourth support site are each displaceable transversely to said spring band in a direction of a width of said spring band and wherein transverse displacements of said central support site and said fourth support site are controlled according to preset programs which take into account changes in the material thickness in said flat blades.

10. A method of producing flat-blade windshield wipers for motor vehicles with curved flat blades, the method comprising the steps of:

feeding a spring band formed of a plurality of flat blades arranged one next to another in a direction of elongation of said spring band through feed rolls and guide rolls;

bending said spring band in one transversal direction between three support sites spaced from each other in a direction of feeding of said spring band and resting successively in an alternating manner on one of two sides of said spring band;

re-bending said spring band in another transversal direction opposite to said one transversal direction in a fourth support site arranged subsequently to said three support sites by a degree of re-bending lower than a bending degree in said bending step;

adjusting a degree of bending to realize different bending radii within one bending process;

separating each individual flat blade of a re-bent spring band from a remaining spring band;

combining each individual flat blade with a rubber-elastic wiping bar;

and mounting to said re-bent flat blade combined with said wiping bar a connection device for a wiper arm;

wherein at least one of said three support sites for bending the spring band in said bending step is designed as a cutting edge, said separating step including passing a cutter along said cutting cage.

11. A method of producing flat-blade windshield wipers for motor vehicles with curved flat blades, the method comprising the steps of:

feeding a spring band formed of a plurality of flat blades arranged one next to another in a direction of elongation of said spring band through feed rolls and guide rolls;

bending said spring band in one transversal direction between three support sites spaced from each other in a direction of feeding of said spring band and resting successively in an alternating manner on one of two sides of said spring band;

re-bending said spring band in another transversal direction opposite to said one transversal direction in a fourth support site arranged subsequently to said three support sites by a degree of re-bending lower than a bending degree in said bending step;

adjusting a degree of bending and/or re-bending to realize different bending radii within one bending process;

separating each individual flat blade of a re-bent spring band from a remaining spring band;

combining each individual flat blade with a rubber-elastic wiping bar;

and mounting to said re-bent flat blade combined with said wiping bar a connection device for a wiper arm; and optically measuring and comparing said flat blades with specified nominal values and using mean deviations from said nominal values for correcting programs in said bending step and said re-bending step.

* * * * *

UNITED STATES PATENT AND TRADEMARK OFFICE
CERTIFICATE OF CORRECTION

PATENT NO.    : 6,532,638 B2
DATED         : March 18, 2003
INVENTOR(S)   : Wilhelm H. et al.

It is certified that error appears in the above-identified patent and that said Letters Patent is hereby corrected as shown below:

<u>Column 5,</u>
Lines 32-33, delete "and mounting to said re-bent flat blade combined with said wiping bar a connection device for a wiper arm"

Signed and Sealed this

Twenty-third Day of March, 2004

JON W. DUDAS
*Acting Director of the United States Patent and Trademark Office*